US009553922B1

(12) United States Patent
Guarraci et al.

(10) Patent No.: US 9,553,922 B1
(45) Date of Patent: Jan. 24, 2017

(54) MEDIA EVENT BASED SOCIAL NETWORKING INTERFACES

(71) Applicant: Twitter, Inc., San Francisco, CA (US)

(72) Inventors: Brian Guarraci, San Francisco, CA (US); Lillian M. Carrasquillo, Somerville, MA (US); Esteban Kozak, Cupertino, CA (US); Pradhuman D. Jhala, Corte Madera, CA (US); Satanjeev Banerjee, San Francisco, CA (US); Nicolas T. Takayama, San Mateo, CA (US); Justin J. Trobec, Fremont, CA (US); Zhanna Shamis, San Francisco, CA (US); Aaron M. Kelley, San Francisco, CA (US); Kevin Ullmann, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 14/267,077

(22) Filed: May 1, 2014

Related U.S. Application Data

(60) Provisional application No. 61/818,746, filed on May 2, 2013.

(51) Int. Cl.
*H04L 29/08* (2006.01)
*G06F 17/30* (2006.01)
*H04N 21/4788* (2011.01)

(52) U.S. Cl.
CPC ......... *H04L 67/10* (2013.01); *G06F 17/30837* (2013.01); *H04N 21/4788* (2013.01)

(58) Field of Classification Search
CPC .... H04N 21/45; H04N 21/25; H04N 21/4788; G06F 17/30657; G06F 17/30321; G06F 17/3053; G06F 17/30864; G06F 17/30336; G06F 17/30684; G06F 17/30619; G06F 17/30622; G06F 17/30861; G06F 17/30837
See application file for complete search history.

(56) References Cited

U.S. PATENT DOCUMENTS

2005/0081159 A1* 4/2005 Gupta ............... G06F 17/22 715/751
2009/0094286 A1* 4/2009 Lee ............... G06Q 30/02
(Continued)

FOREIGN PATENT DOCUMENTS

JP WO 2013018325 A1 * 2/2013 ........... G06F 13/00
WO WO 2011017316 A1 * 2/2011 ....... G06F 17/30796

*Primary Examiner* — James E Richardson
(74) *Attorney, Agent, or Firm* — Fenwick & West LLP

(57) ABSTRACT

A social networking system aggregates content related to the media events that have aired or are currently airing from a variety of sources, such as the entity broadcasting the media event and users that author content items referencing the media events. The social networking system generates multiple event interfaces that allow users of the social networking system to consume content, both user authored content and content curated from external sources, related to a media event. The interfaces include both content items that have a high correlation with the media events and visual representations of the user response to media event. Further, the interfaces include interface elements that allow users to easily navigate and interact with the information being presented as well as provide additional content related to the media events.

30 Claims, 11 Drawing Sheets

(56) References Cited

U.S. PATENT DOCUMENTS

| | | | |
|---|---|---|---|
| 2010/0107082 A1* | 4/2010 | Ban | H04N 7/17318 715/733 |
| 2010/0122309 A1* | 5/2010 | Kawakami | H04N 7/17318 725/116 |
| 2011/0041080 A1* | 2/2011 | Fleischman | G06Q 30/02 715/751 |
| 2012/0215903 A1* | 8/2012 | Fleischman | G06Q 30/0201 709/224 |
| 2012/0284343 A1* | 11/2012 | Lee | G06Q 50/01 709/206 |
| 2012/0291070 A1* | 11/2012 | Feng | H04N 21/23433 725/40 |
| 2013/0036124 A1* | 2/2013 | Ambwani | G06F 17/30796 707/749 |
| 2013/0125172 A1* | 5/2013 | Suh | H04L 51/32 725/46 |
| 2013/0144891 A1* | 6/2013 | Nagasaka | G06F 17/30634 707/749 |
| 2013/0159858 A1* | 6/2013 | Joffray | H04N 21/4788 715/719 |
| 2014/0067825 A1* | 3/2014 | Oztaskent | H04N 21/4782 707/748 |
| 2014/0068692 A1* | 3/2014 | Archibong | H04L 65/4084 725/116 |

* cited by examiner

MEDIA EVENT BASED SOCIAL NETWORKING INTERFACES

CROSS REFERENCE TO RELATED APPLICATIONS

This application claims a benefit of and priority to under 35 U.S.C. §119(e), U.S. Provisional Application Ser. No. 61/818,746, filed on May 2, 2013, which is incorporated herein by reference in its entirety.

BACKGROUND

Online social media services, such as social networking sites, search engines, news aggregators, blogs, and the like provide a rich environment for users to comment on events of interest and communicate with other users. Social media content items authored by users of social networking systems often include references to media events that appear in time-based media such as television shows, news reports, sporting events, movies, concert performances, and the like. However, although the content items can sometimes refer to specific media events that appear in the time-based media, the social media content items themselves typically are isolated from the media events and time-based media referenced by those content items.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. Configuration Overview

Social networking systems allow users to author and publish large amounts of content items visible to other users. In some cases, the content items are authored in reference to media events that the user has recently experienced (e.g., a TV show) or is experiencing contemporaneously. Further, social networking systems aggregate content related to the media events that have aired or are currently airing from a variety of sources, such as the entity broadcasting the media event as well as entities that store metadata related to the media events. Interfaces that allow users of a social networking system to consume content related to a media event, including both user authored content as well as content curated from external sources are the focus of the discussion below. To generate such interfaces, the social networking system correlates content items with media events and measures users' response to media events. The interfaces include both individual content items that have a high correlation with the media events as well as visual representations of the aggregate measured response, in terms of content items, to a media event. Further, the interfaces include interface elements that allow users to easily navigate and interact with the information being presented as well as provide additional content related to the media events.

II. Computing Environment Overview

Figure 1:
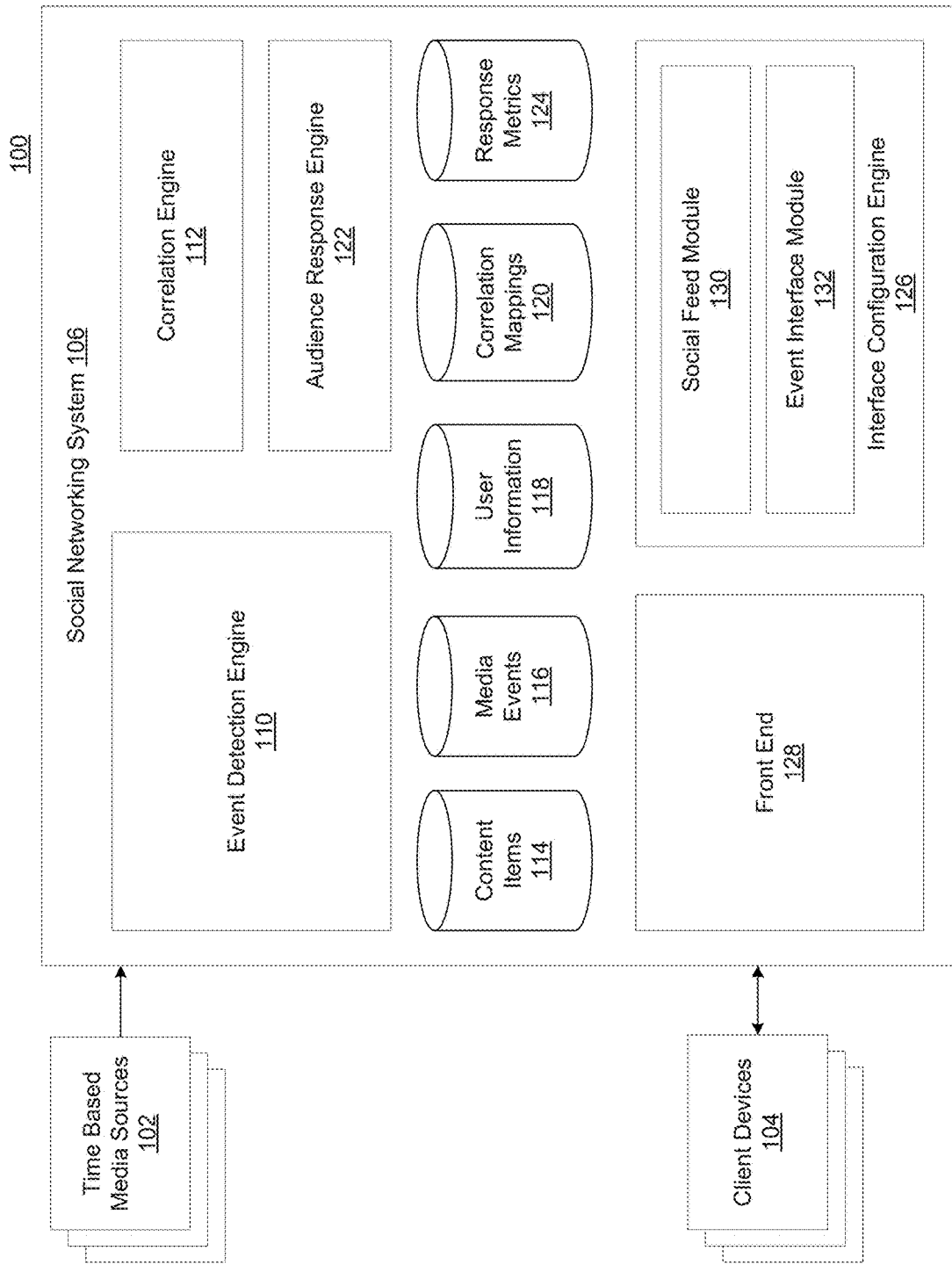
FIG. 1 illustrates the computing environment of one embodiment of a system for providing content related to time-based media events to users.

FIG. 1 illustrates the computing environment 100 of one embodiment of a system for providing content related to time-based media events to users. The environment 100 includes time-based media sources 102, client devices 104 and a social networking system 106.

The time-based media sources 102 (also referred to herein as "sources 102") include sources of broadcast media content, multicast media content, direct or peer to peer provided media content, streaming media content, or any other mechanism for providing media content. The media content may be delivered through coaxial cable (e.g., cable television), via satellite (e.g., DIRECTTV), via radio, via internet, or any other method of delivery. The media provided by time-based media sources 102 may include, for example, TV shows, advertisements (e.g., TV commercials), videos, movies, serials, audio recordings, and the like.

Client devices 104, operated by users of the social networking system 106, include computing capability to both access time-based media content and access the social networking system 106 to author and view social media content items. A client device 106 may be a desktop computer, a laptop computer, a smart phone, a personal digital assistant (PDAs), or any other device including computing functionality and data communication capabilities.

The social networking system 106 may be a social network, blog, news media, forum, user group, etc. Examples of such a system include FACEBOOK and TWITTER. These systems generally provide a plurality of social media (SM) users with the ability to communicate and interact with other users of the system. SM users typically author various social media content items (e.g., posts, videos, photos, links, status updates, blog entries, tweets, profiles, and the like), which may refer to media events (e.g., TV shows, advertisements) or other social media content items (e.g., other posts, etc., pages associated with TV shows or advertisements). SM users may also engage in discussions, games, online events, and other participatory services via the social networking system 106. The social networking system 106 also provides users with content specific interfaces such that a user interested in a particular type of content or content relevant to a particular event may consume such content via a dedicated interface.

The content items store 114 in the social networking system 106 stores social media content items (also referred to herein as "content items") authored by users of the social networking system 106. Generally, each content item includes at least a reference to the content item signifying the authoring user (e.g., the authoring user's profile in the social networking system 106). Other users (e.g., friends of the user) or objects (e.g., events such as the TV show with which the content item is associated) may also be referenced in a content item. Content items may include long form and short form items such as posts, videos, photos, links, status updates, blog entries, tweets, and the like. Other examples of content items include audio of commentators on, or participants of, another event or topic (e.g., announcers on TV or radio) and text transcriptions thereof (generated manually or automatically), event-related information (e.g., recipes, instructions, scripts, etc.), statistical data (e.g., sports statistics or financial data streams), news articles, and media usage statistics (e.g., user behavior such as viewing, rewind, pausing, etc.).

The event detection engine 110 in the social networking system 106 accesses time-based media events from one or more sources 102 and stores the media events in the media events store 116. Time-based media events are individual airings of media content that occur at a specific point in time from a particular content source 102 (e.g., network or channel). Each airing of a particular piece of content is a separate time-based media event. Time-based media events may also be referred to as instances, for example an airing of a TV show may be referred to as a TV show instance. If a particular episode is aired at multiple different times, each airing is a separate instance.

Sources 102 may provide events in a variety of formats including any one or more of raw audio/video streams, packaged digital content including metadata, separate programming information (e.g., TV guides) including airing information, and other combinations of the above. Example sources 102 include online video providers, traditional cable networks, radio broadcasters, live captured and broadcasted content, directly captured mobile device content, among others. Generally, examples of different kinds of time-based media events include videos, audio recordings, MIDI sequences, animations, and combinations thereof. It is anticipated that other types of time-based media within the scope of this description will be developed in the future (e.g., 3D media, holographic presentations, immersive media, and so forth).

A time-based media event is considered to include not only the media content itself, but also any information that is provided with or later associated with the media content. This additional information may be stored as metadata, and may include including air dates and times for aired content, and information about the aired content and the source 102 (or network) providing the content. In the case of a raw content feed that is absent this metadata, the event detection engine 110 may be configured to segment raw content and access external media metadata to identify metadata that should be correlated with the segmented raw content.

Examples of metadata that may be included or correlated with an event include the type of event occurring, the name of the event occurring, the source providing a TV show event, genre information, descriptions, the ad campaign, product, and/or brand being advertised, the actors/characters/cast involved in the event, the scene/location of the event, airing information including the time and geographic region of airing, the time length of the event. For example, metadata for an advertisement event may include information such as "Brand: Walmart; Scene: father dresses up as clown; Mood: comic." As illustrated in these examples, the metadata can be structured as tuples of <name, value> pairs.

Metadata may also include low level features for an event, e.g., image or audio features or content features, hand annotations with text descriptions, or both. Metadata may be represented as text descriptions of time-based media events and as feature vector representations of audio and/or video content extracted from examples of events. Examples of such metadata include a number and length of each shot, histograms of each shot (e.g., color, texture, edges, gradients, brightness, etc.), and spectral information (e.g., frequency coefficients, energy levels) of the associated audio. Metadata may be generated using human annotation (e.g., via human annotators watching events or samples thereof) and may be supplemented with automatic annotations. Metadata may also include different types of features including but not limited to scale-variant feature transform (SIFT), speeded up robust features (SURF), local energy based shape histogram (LESH), color histogram, and gradient location orientation histogram (GLOH).

Time-based media events provided by a source 102 may be broken into categories. One such category is programming events, which includes events such as TV shows, radio broadcasts, and streaming internet videos. Another category that is distinguished from programming events are advertising events. Advertising events often air in conjunction with programming events. For example, a TV show may include one or more commercials interspersed throughout its running time as sponsorship for the TV show. In this example, the TV show event includes the running time of the TV show minus time dedicated to commercials, whereas the each commercial that airs during the TV show is its own advertisement event.

Turning back to FIG. 1, the user information store 118 stores information associated with different users of the social networking system 106. For the purposes of this discussion, a user of the social networking system 106 may be an individual human user, an entity or a social media identity not necessarily tied to any individual human. Information associated with a user includes personal information, such as names and birthdates, and also information related to the user's interests. Further, for each social media user, the user information store 118 stores connection graph data representing relationships between the user and a set of connected accounts. The connection graph data includes a set of accounts directly connected with the social media user, accounts organized by degree of separation from the social media user, and accounts organized by relationship type with the social media user (e.g., bi-directional relationships, uni-directional relationships, followers, subscribers, friends, and etc.). The connection graph data can further identify account categories and/or types which are most closely associated with the social media identity. For example, confidence scores can be calculated for a predefined set of account types, each confidence score representing a relevance of the account type to the social media identity. In another example, confidence scores can be calculated for a set of accounts, each confidence scores representing similarity of the social media identity to a given account in the set of accounts.

The discussion below describes how components of the social networking system 106 operate in conjunction to: (1) correlate time-based media events with social media content items (discussed in Section III), (2) gauge overall response by social media users to time-based media events (discussed in Section IV), and (3) present content, including social media content items, related to time-based media events to social media users (discussed in Section V).

III. Social Content Items to Events Correlation

The correlation engine 112 is configured to correlate social media content items authored by users of the social networking system 106 with time-based media events identified by the event detection engine 110. Specifically, the correlation engine 112 determines whether or not a social media content item is relevant to an event by determining whether the social media content item is referring to the event, either directly or indirectly. Social media content items are often ambiguous as to whether they refer to an event, and if so, which event they refer to. For example, a social media content item such as the single word post "Touchdown!" may refer to a football game event or may be used as a metaphor for a success in areas unrelated to football. The correlation engine 112 is determined to resolve this ambiguity. Specifically, for a social media content item, the correlation engine 112 computes a confidence score indicating the confidence that the social media content item refers to the event. If the confidence exceeds a threshold, the social media content item is considered correlated (or relevant to) the event, and a mapping indicating the correlation is stored in the correlation mappings store 120.

Figure 2:
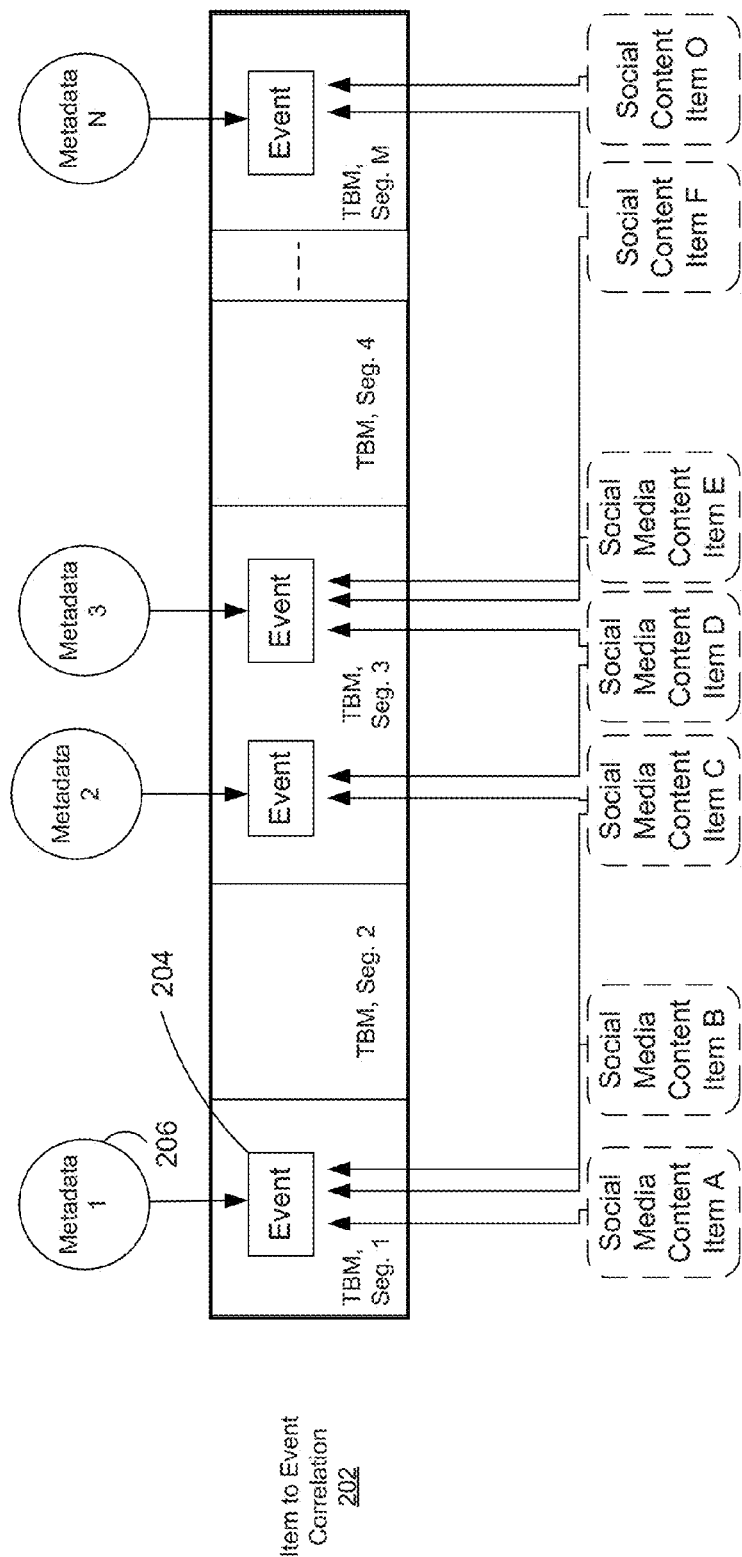
FIG. 2 is a conceptual diagram illustrating social media content item to time-based media event correlation at a high level according to one embodiment.

FIG. 2 is a conceptual diagram illustrating social media content item to time-based media event correlation 202 at a high level according to one embodiment. As shown, each event is a part of a time-based media segment (TBM segment) captured from the time-based media sources 102. The correlation engine 112 performs item to event correlation 202 by analyzing time-based media events, such as event 204, and corresponding metadata, such as metadata 206, to determine which social media content items are correlated with the event. For example, in FIG. 2, social content items A, B and C are determined to be correlated with event 204.

Figure 3:
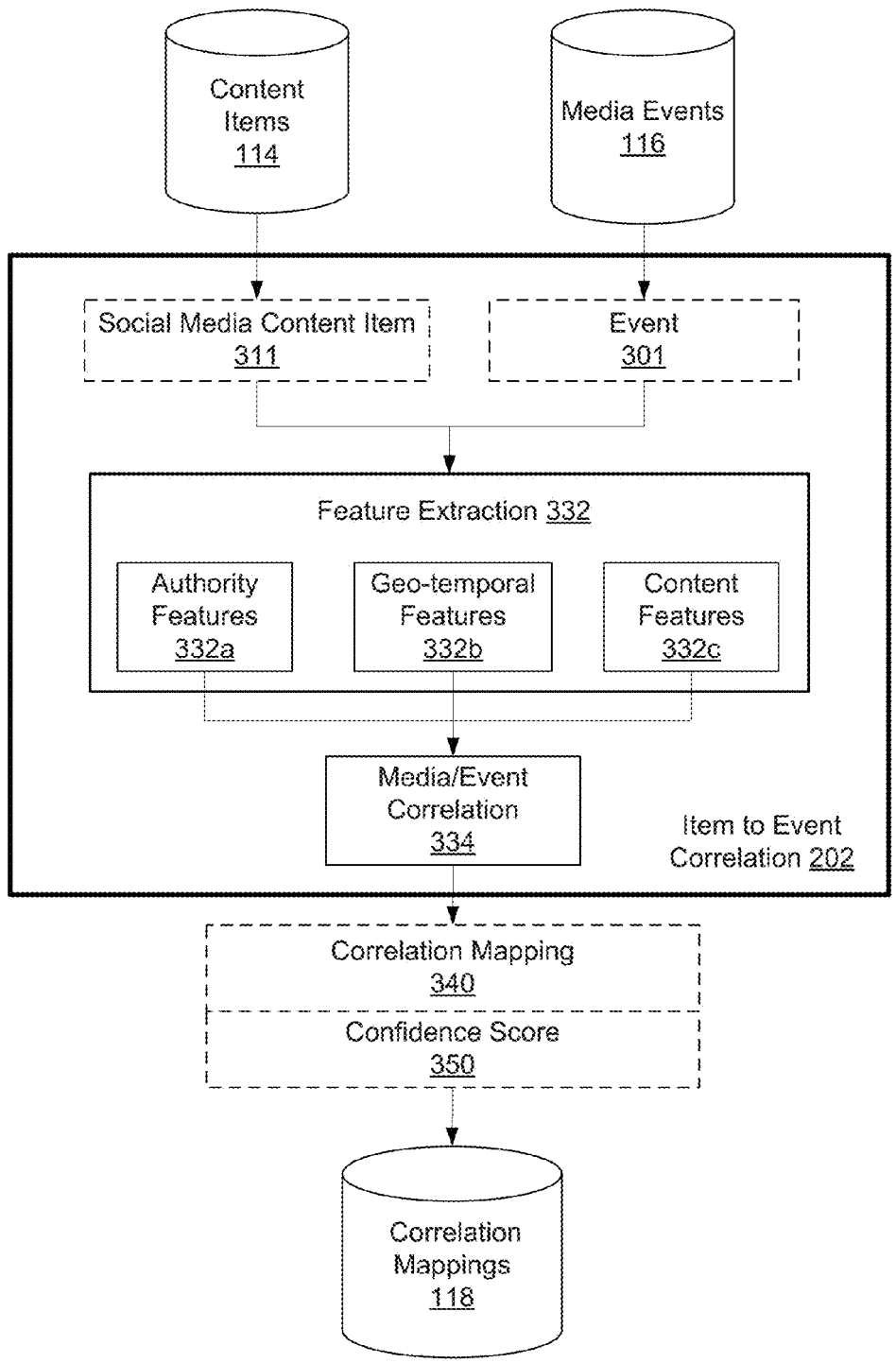
FIG. 3 is a block diagram and flowchart illustrating social media content item to time-based media event correlation according to one embodiment.

FIG. 3 is a block diagram and flowchart illustrating social media content item to time-based media event correlation 202 according to one embodiment. The correlation engine 112 retrieves events, such as event 301, from the media events store 116 and the social media content items 311 from the content items store 114.

Filtering

In one embodiment, the correlation engine 112 filters the social media content items 311 prior to correlation 202. In operation, the correlation engine 112 filters the social media content items 311 in order to create a set of candidate content items with a high likelihood of being relevant to a specific event. The correlation engine 112 may use any one of a number of criteria to filter content items. One such criteria is whether a content item includes at least one reference to a specific event. The correlation engine 112 may also analyze whether the content item is temporally related to the event, such that only content items authored a given time frame of the event in question are considered relevant.

The correlation engine 112 may remove from further processing social media content items that do not pass one or more of the initial filtering criteria. The output of the filtering process is an updated set of social media content items 311 including only the social media content items that passed the initial filtering criteria.

Correlation

The social media content item to event correlation 202 performed by the correlation engine 112 includes a comparative feature extraction 332 and a correlation function 334. The comparative feature extraction 332 converts input of an event 301 and a social media content item 301 into a feature vector representation, which is then input to the correlation function 304. The correlation function uses the received features to create a relationship between the event features and the social media content item features. The relationship may be co-occurrence, correlation or other relationships as described herein.

The comparative feature extraction 332 extracts three major types of features: content features 332c, geo-temporal features 332b and authority features 332a. Content features 332c refer to co-occurring information within the content of the social media content items and the metadata for the media events, e.g., terms that exist both in the content item and in the metadata for the media event. Domain ontologies 319 may be used to expand the set of terms used when generating content features.

Geo-temporal features 332b refer to the difference in location (e.g., geographic region of airing) and time at which the input media was generated from a location and time of authorship of the social media content item about the event. Such information is useful as the relevance of social media content item to an event is often inversely correlated with the distance from the event (in time and space) that the media was produced. In other words, a social media content item that is relevant to an event is often produced during or soon after that event, and sometimes by people at or near the event (e.g., a sporting event) or exposed to it (e.g., within broadcast geographical area for television-based event). For media events, geo-temporal information can be determined based on the location and/or time zone of the event or broadcast of the event, the time it started, the offset in the video that the start of the event is determined, the channel on which it was broadcast. For social media content items, geo-temporal information can be part of the content of the social media content item itself (e.g., a time stamp on a blog entry or status update) or as metadata of the media or its author.

The geo-temporal features 332b describe the difference in time between when the social media content item was created from the time that the event itself took place. In general, smaller differences in time of production are indicative of more confident alignments. Such differences can be passed through a sigmoid function such that as the difference in time increases, the probability of alignment decreases, but plateaus at a certain point. The parameters of this function may be tuned based on an annotated verification data set. The spatial features describe the distance from the author of the content item location relative to the geographical area of the event or broadcast. Spatial differences are less indicative because often times people comment on events that take place far from their location. A sigmoid function may be used to model this relationship as well, although parameters are tuned based on different held out data.

Authority features 332a describe information related to the author of the SM and help to increase the confidence that a social media content item refers to a media event. The probability that any ambiguous post refers to a particular event is dependent upon the prior probability that the author would post about a similar type of event (e.g., a basketball game for an author who has posted content about prior basketball games). The prior probability can be approximated based on a number of features including: the author's self-generated user profile (e.g., mentions of a brand, team, etc.), the author's previous content items (e.g., about similar or related events), and the author's friends (e.g., their content contributions, profiles, etc.). These prior probability features may be used as features for the mapping function.

The correlation function 334 takes the set of extracted features 332a-c and outputs a mapping 340 and a confidence score 350 representing the confidence that the social media content item refers (or references) to the media event. For each feature type 332a-c, a feature specific sub-function generates a score indicating whether the social media content item refers to the annotated event. Each sub-function's score is based only on the information extracted in that particular feature set. The scores for each sub-function may then be combined using a weighted sum, in order to output a mapping 340 and an associated confidence score 350, as shown below for an event x and a social media content item y:

$$\mathrm{align}(\mathrm{feat}(x,y)) = [\alpha \cdot \mathrm{content}(\mathrm{feat}(x,y))] + [\beta \cdot \mathrm{geoTemp}(\mathrm{feat}(x,y))] + [\gamma \cdot \mathrm{author}(\mathrm{feat}(x,y))]$$

where $\alpha$, $\beta$, and $\gamma$ are the respective weights applied to the three feature types, and align(feat(x,y)) is the confidence score. Both the weights in the weighted sum, as well as the sub-functions themselves may be trained using supervised learning methods, or optimized by hand. The mapping 340 and confidence score 350 are stored in a correlation mappings store 120.

IV. Determining Audience Response to Time-Based Media Events

Turning back to FIG. 1, the audience response engine 122 computes, using the correlations between time-based media events and social media content items, various audience response metrics (ARMs) that quantify how populations of social media users are responding to specific time-based media events. Audience response metrics may be generated for a time-based media event as a whole or for different moments in time during which the time-based media event was airing. The audience response engine 122 stores the various audience response metrics in the response metrics store 124. The stored metrics may be used by the audience response engine 122 for calculations of additional metrics or used to generate event-specific interfaces (as discussed in Section V below). The metrics and/or the ratings themselves may be used in various ways, e.g., future content considerations, planning, advertising scheduling, etc.

A list of some of the metrics generated by the audience response engine 122 according to one embodiment is described below. ARMs include all of the measures below, and can be divided into a number of classes. A first class of ARMs is content item-based ARMs, or ciARMs, which are metrics that measure audience response by the number of individual content items associated with an event, either for the individual event or in relation to other events. A second class of ARMs is unique author-based ARMs, or UARMs, which are metrics that measure audience response by the number of unique authors of content items associated with an event, either for the individual event or in relation to other events. A third class of ARMs is network-based ARMs, or NARMs, which are metrics of audience response that take into account the network of connections between authors of content items associated with an event. Each of these classes also can be broken down into ARMs that are reflective of values specific to individual events, and values that compare events. In addition, various filters may be applied to the ARMs, and ARMs may be combined with other ARMS, consumption based metrics (CBMs), and/or monetary values associated with time-based media events.

Further, ARMs may also be computed for portions of a media event. For content item-based ARMs, the audience response engine 122 may measure audience response to a particular portion of the media event by measuring the number of individual content items associated with that portion of the media event. Similarly, for unique author-based ARMs, the audience response engine 122 may measure audience response to a particular portion of the media event by measuring the number of individual unique authors of content items associated with that portion of the media event. The audience response engine 122 determines the association between a content item and a portion of the media event based on a timestamp associated with the content item. When the timestamp associated with the content item corresponds to the time during which the portion of the media event aired, then the audience response engine 122 determines the content item as associated with the portion of the media event.

ciARMs

Content item-based ARMs that are specific to a particular event, and include Audience Response Count, Audience Response Rate, and some forms of Audience Response Acceleration. Audience Response Count (ARC) is the total number of social media content items aligned with a given time-based media event. This can be a raw count value, a log scale, or a value normalized against a selected set of events. For example, for a given NFL football game, there may be 18,000 social media content items aligned with that event.

Audience Response Rate (ARR) is the ARC for the time-based media event normalized by time. ARR captures the rate at which audience members are responding to the event through social media. An example calculation is the ratio of ARC to length of the event, e.g., [ARC/length]. Length can be in terms of minutes, e.g., to normalize ARCs for comparing events of different lengths (e.g., 30 minutes versus 60 minutes). Continuing the above example, if the football game lasted three hours (180 minutes) then the ARR over the entire length of the game would be 18,000/180, or 100 items per minute.

Audience Response Acceleration (ARA) is a measure of the rate of change between ARRs at different times within an event. ARA thus captures how audience interest changes during a given event, as indicated by changes in the rate at which audience members are posting social media items about the event. ARAs measure the rate of change between two times within a single event. For example, the first 10 minutes of an event could be compared to any other 10 minute segment of a 60 minute event, which would provide information about which portions of the event prompted the greater audience response. An example calculation is the ratio of change in ARR to change in time, e.g., $[(ARRt2-ARRt1)/(t2-t1)]$, where $ARRti$ is the ARR value at times $t1$ and $t2$. Time can be measured in various ways, including minutes, seconds, segments (not including commercials), scenes, etc. Continuing the football game example, the above-noted ARR of 100 items per minute represents the average number of items per minute over the entire game. However, that ARR does not provide information about individual times within the event, during which times the ARC might be higher or lower than the average 100 items.

For example, if during the first 10 minutes of the game the ARR is 100 and during the 10 minutes one hour into the game the ARR is 200, ARA is calculated as (200−100)/50 min, or an acceleration of 2. Calculation of ARAs may include additional input from the timing engine 253.

Content item-based ARMs that compare events include Audience Response Share and some forms of Audience Response Acceleration, as well as direct comparisons between ARCs, ARRs, and ARAs for different events. Audience Response Share (ARS) is a measure of audience response to a time-based media event during a time period normalized by total audience response for all time-based media events during the same time period. ARS measures how much of the total audience for all time-based media during a given period are responding to a particular event during that period. The underlying ARMs used can be ARC, ARR, etc. Time periods can be any measurable period of interest, including programming time slots (8:00-8:30 p.m.; 8:00-9:00 p.m.), portions of a time slot or event (e.g., 8:00-8:10 p.m.), viewing segments (midday; primetime), entire day, week, season, etc. An example calculation is the ratio of the ARM for a given event i at given time t to the total of the ARMs for all other events k at that time, $[ARM_{i,t}/(\Sigma\ ARM_{k,t})]$. For example, if the ARC for a new television show at 8:00-9:00 pm is 10,000 and the total of all ARCs for that time period is 500,000, the ARS would be equal to 0.02, or 2% of the total ARC (2% of total response across all shows) for that time period. By contrast, if a very popular television show had an ARC of 100,000 for the same period, the ARS would be 0.2, or 20% of the total ARC (20% of response across all shows) for that time period.

As noted above, ARA is a measure of the rate of change between ARCs. Audience Response Trend (ART) is akin to an inter-event ARA, as it measures the rate of change between two different instances of a time-based media event (or different instances of a type of time-based media event) over the duration between the instances. Duration can be absolute time between events (minutes, hours) or relative (number of airings between events). For example, the ARC for the first episode of the season of a TV show could be compared to the ARC for the fifth episode, e.g. normalized by the number of weeks between shows or number of episodes in between. An example calculation is the ratio of change in ARC to duration for the change, e.g., $(ARC_{t2}-ARC_{t1})/(t2-t1)$, where t2 and t1 are the times at which the ARCs are measured. Using the example above, if a first episode of the season of a television show had an ARC of 10,000, and a fifth episode of the season had an ARC of 15,000, and there were four weeks between the episodes, the ART would have a positive trend of 1,250 ARCs per week. Calculation of ARTs may include additional input from the timing engine 253.

In addition ARC, ARR, ARA, and ART for individual events, as discussed above, can be aggregated (e.g., summed, unweighted, or weighted) and/or directly compared to each other during a specified time period, e.g., a scheduled programming time slot, viewing segment, day, week, season, etc. For example, ARCs for all primetime shows during a given week could be aggregated into a ranked list, e.g., for ratings determinations.

UARMs

The above-discussed ARMs alternatively can be measured by unique authors of social media content items instead of total content items. These are the second class of metrics called Unique Author Response Metrics (UARMS), which are metrics that measure audience response by the number of unique authors of content items associated with an event. UARMS that are specific to an event include Unique Author Response Count, Unique Author Response Rate, and Unique Author Response Acceleration. As with the content item based ARMs, each can be broken down into UARMs that are reflective of values specific to individual events, and values that compare events.

Unique Author Response Count (UARC) is the total number of unique authors of social media content items aligned with a time-based media event. The UARC can be a raw count or use a log scale. For example, for a given NFL football game there may be 18,000 content items authored by 6,000 unique authors, with each author averaging 3 items.

Unique Author Response Rate (UARR) is the UARC normalized by time. An example calculation is the ratio of UARM to length of the event, e.g., [UARC/length]. Length can be in terms of minutes, e.g., to normalize UARCs for comparing events of different lengths (e.g., 30 minutes versus 60 minutes). Calculation of UARR may include additional input from the timing engine 253. Continuing the above example, for a three hour football game, there would be 2000 unique authors per hour.

Unique Author Response Acceleration (UARA) is a measure of the rate of change between UARRs for two times within an event over the duration between the times. UARA captures how stable or growing is the audience interest in an event. For example, the first 10 minutes of an event could be compared to any other 10 minute segment of a 60 minute event, which would provide information about which portions of the event prompted the greater number of unique authors contributing content items. An example calculation is the ratio of change in UARR to change in time, e.g., $[(UARR_{t2}-UARR_{t1})/(t2-t1)]$. Continuing the above example, if during the first quarter of a football game there were 1,000 unique authors who responded, and then in the third quarter there were 4,000 additional unique authors who responded, that would indicate that there was very significant acceleration in audience for this event. By contrast, if the number of unique authors during both quarters remained 1,000, that indicates a stable audience. As with ARAs, time can be measured in various ways, including minutes, seconds, segments (not including commercials), scenes, etc. Calculation of UARAs may include additional input from the timing engine 253.

UARMs that compare events include Unique Author Response Share and some forms of Unique Author Response Trend, as well as direct comparisons between UARCs, UARRs, and UARAs for different events. Unique Author Response Share (UARS) is a measure of unique author response to a time-based media event during a time period normalized by the number of total unique authors responding to all time-based media events during the same time period. UARS captures what proportion of the unique authors during a given time period were interested in a specific media event, relative to other media events at that time. UARMs used can be UARC, UARR, etc. Time periods can be any measurable period of interest, including programming time, portions of a time slot or event, viewing segments, day, week, season, etc. An example calculation is the ratio of UARM at a given time to all UARMs at that time, e.g., $[UARM(time\ t)/(\Sigma\ UARMs(time\ t))]$. For example, the UARM for a show at 9 pm is 1,000, and the sum of all UARMs for all shows in that time slot is 150,000, then the UARS is less than a 1% share of all unique authors during that time slot, i.e., the show is not watched by a very broad audience. In addition, the time limitations could be removed from the denominator (e.g., sum of all known UARMs across all times) to determine the UARS as a function of all known unique authors of all items to yield an Aggregated Unique Author Response Share (AUARS), indicating a percent response among the population of all unique authors. For example, if a show gets a response (UARM) of 500,000, and the total number of known unique authors is 5,000,000, the AUARS is 10% of all known unique authors.

The unique author Audience Response Trend (UART) is a measure of the rate of change between UARCs for instances of an event (or instances of a type of time-based media event) over a duration between the instances. Duration can be absolute time (minutes, hours) or relative (number of airings in between). For example, the UARC for the first episode of the season of a TV show could be compared to the UARC for the last episode, e.g. normalized by the number of weeks between the first and last episodes or number of episodes between them. For example, a UARC for a first episode of 5,000 unique authors and a UARC for a second episode of 7,000 unique authors would produce a positive trend of 2,000 unique authors between episodes one and two. An example calculation is the ratio of change in UARC to duration between UARCs, e.g., [(UARC2−UARC1)/D(UARC2−UARC1), where D represents duration].

In addition, UARC, UARR, UART, and UARA for individual events, as discussed above, can be aggregated and/or directly compared to each other during a specified time period, e.g., a scheduled programming time slot, viewing segment, day, week, season, etc. For example, UARCs for all primetime shows during a given week could be aggregated into a ranked list to show the UARCs relative to other primetime content.

NARMs

The above-discussed ARMs alternatively can be measured taking into account the network of connections between authors of content items associated with an event. These are the third class of metrics called Network-based Author Response Metrics (NARMs), which are metrics that measure audience response by the number of users who are connected to authors of content items associated with time-based media events. By incorporating the network structure of content item authors, NARMs provide measures that capture the resonance of audience response to an event amongst other users within the social networks of the authors of those content items.

Resonance, as used herein, means the effect that a first responding author (in a network of responding authors) has on other responding authors in his/her network(s). In such a measurement, the first author's response itself may affect the overall audience response, e.g., responding viewers of the same event who did not respond prior to the first author's response, or viewers who increased their number of responses based on the first author's response, or connections of the first author who became viewers (i.e., turned on the show, watched it using a video on demand service, or otherwise time-shifted the program) based in part on the first author's response—each of these groups of authors may increase the overall counts based in part on the first author's response. (As used here, "first" does not necessarily mean the author is first in time to respond, but rather first relative to subsequent responders in the same network.) By measuring such resonance, NARMs afford insight into not only the quantity of response to an event, but also the amount of exposure (including an indication of virality) that that response garners.

In one implementation, the NARM for an event may be computed as the cardinality of the set which is composed of the union of all sets of users in the networks of the authors of content items associated with that target event:

$$NARM(event) = \left| \bigcup_{c \in content-items(event)} \{users\_in\_network(author\_of(c))\} \right|$$

This measurement allows for overlap, as several user authors may share connections with each other.

In another implementation, the NARM for an event may be computed as the cardinality of the set which is composed of the intersection of all sets of users in the networks of authors of content items associated with the target event:

$$NARM(event) = \left| \bigcap_{c \in content-items(event)} \{users\_in\_network(author\_of(c))\} \right|$$

This measurement eliminates overlap and redundancy based on a user falling into the network of more than one author by measuring unique users.

NARMS that are specific to an event include Network-based Author Response Count, Network-based Author Response Rate, Network-based Audience Response Trend, and Network-based Author Response Acceleration. As with the content item based and unique author ARMs, each can be broken down into NARMs that are reflective of values specific to individual events, and values that compare events. Network-based Author Response Count (NARC) is the cardinality of the set of combined users in the networks of the authors of content items associated with a target event. This can be a raw count or use a log scale. For example, given two events with the same number of unique authors, the NARC for one event still may be higher than the other if the authors responding to one event, on average, have larger social networks than the other event. For an event with 5,000 unique authors, the NARC may be 1,000,000 if the 5,000 authors have, on average, 200 connections in their respective networks. In this example, the NARC is a union type, and thus does not consider whether there is overlap between the authors in the networks. For a NARC that is an intersection type, for the same 5,000 unique authors, the NARC may be lower, e.g., 750,000 considering that the 200 (average) connections of the unique authors overlap with each other, Network-based Author Response Rate (NARR) is the NARC normalized by time. An example calculation is the ratio of NARM to length of the event, e.g., [NARC/length]. Length can be in terms of minutes, e.g., to normalize NARCs for comparing events of different lengths (e.g., 30 minutes versus 60 minutes). Using the above event and the union type of cardinality, the NARC about (1,000,000) is divided by 60 minutes to produce a NARR of 16,667.

Network-based Author Response Acceleration (NARA) is a measure of the rate of change between NARRs for two times within an event over the duration between the times. For example, the first 10 minutes of an event could be compared to any other 10 minute segment of a 60 minute event, which would provide information about which portions of the event prompted the greater number of unique authors contributing content items. An example calculation is the ratio of change in NARR to change in time, e.g., [(NARR2−NARR1)/(t2−t1)]. As with other ARAs, time can be measured in various ways, including minutes, seconds, segments (not including commercials), scenes, etc. For example, the NARAs for two equal-length shows for a first 10 minutes and last 10 minutes of the shows may be identical, e.g., (200−100)/50 min, or two-fold acceleration of unique author response rate between the first 10 minutes and the last 10 minutes. However, if the authors for the first show on average have larger networks (e.g., 250) than the authors for the second show (e.g., 150), the NARA for the first show (e.g., (100×250)/50, or 500) will be higher than for the second show (e.g., 100×150)/50, or 300). Calculation of NARAs may include additional input from the timing engine 253.

NARMs that compare events include Network-based Author Response Share and Network-based Author Response Trend, as well as direct comparisons between NARCs, NARRs, and NARAs for different events. Network-based Author Response Share (NARS) is a measure of network-based response to a time-based media event during a time period normalized by the total amount of network-based response for all time-based media events during the same time period. NARMs used can be NARC, NARR, etc. Time periods can be any measurable period of interest, including programming time, portions of a time slot or event, viewing segments, day, week, season, etc. An example calculation is the ratio of an NARM at a give time to all NARMs at that time, e.g., [NARMt/(Σ NARMst)]. For example, again using the union type NARC from the first example above of 1,000,000 exposed users, over the total NARMs for all events during the same timeframe, e.g., 500,000,000, would produce a NARS of 0.2 percent of all exposed users. In addition, the time limitations could be removed from the denominator (e.g., sum of all NARMs at time t) to determine the NARS as a function of the total number of users within a network to yield an Aggregated Network-based Author Response Share (ANARS), indicating a percent network-based response among the population of the entire network.

NART is a measure of the rate of change between NARCs for two instances of an event (or instances of a type of time-based media event) over the duration between the instances. Duration can be absolute time (minutes, hours) or relative (number of airings in between). For example, the NARC for the first episode of the season of a TV show could be compared to the NARC for the last episode, e.g. normalized by the number of weeks between the first and last episodes or number of episodes between them. For comparison between events of the same type, NARCs could be measured between the first and last commercial during a time slot, which might not be instances of the same event, but rather of events of the same type (e.g., commercials). As above, the NARCs could be compared relative to the time between the commercials, or the number of other commercials in between. An example calculation is the ratio of change in NARC to duration between NARCs, e.g., (NARC2−NARC1)/D(NARC2−NARC1), where D represents duration.

In addition, NARC, NARR, NART, and NARA for individual events, as discussed above, can be aggregated and/or directly compared to each other during a specified time period, e.g., a scheduled programming time slot, viewing segment, day, week, season, etc. For example, NARCs for all primetime shows during a given week could be aggregated into a ranked list.

Combined Metrics

The audience response engine 122 may combine one or more of the above-discussed ARMs in many different useful ways for understanding audience engagement with time-based media events. Multiple ARMs can be combined, ARMs can be combined with Consumption Based Metrics (CBMs), and/or ARMs can be combined with other information about the time-based media, such as costs associated with various time-based media events, as well as information about the authors of content items associated with events.

For example, demographic and response content filters first can be applied, combined with Unique Author Response Share (UARS) to provide a measure of positive response to an event normalized by the total count of positive female response to events within the same time period. Then the event could be compared to all other events within the time period (UARS), further filtered by event type. This could provide information about positive female response to an event, e.g., an advertisement for a particular clothing retailer, as compared to other ads for clothing retailers in a one-week period.

In another example, only pre-event content items are considered for a time-based media event, such as events that occur before a season premiere of a television series. ARA could then be calculated between time 0, e.g., before any advertisement of the new season; time 1, e.g., after a first series of advertisements that the next season is coming; and time 2, e.g., after a preview is shown, to determine how each impacted the audience anticipation of the event. These metrics then could be compared to similar numbers for previous seasons to determine whether anticipation has gone up or down since the previous year, or compared to metrics for other television series with similar advertising schedules, as a measure of anticipated engagement with the series versus other series premieres.

In yet another example, the number and distribution of audience responses over various times and among an author's networks during the time-based media event could be used to determine the virality of audience response to the event (e.g., highly viral response would be indicated by overall numbers that increase quickly and are high in number of unique authors responding, especially among authors connected in a network), the breadth of the audience responding to the event (e.g., if many content items are provided, but only by a small number of unique responders, which would indicate strong appeal to a narrower audience), or other measures of event popularity and engagement levels among the responding audience.

Measures of various ARMs can be combined by the audience response engine 122 with Consumption Based Metrics (CBMs), which are measures of audience consumption, to estimate the number of viewers who respond to an event and estimate response percentages. For example, an ARM for an event can be divided by an estimated audience size that viewed the event (based on a CRM) to provide a metric of Audience Response per, e.g., 100,000 viewers. Further, ARMs can be normalized by the percentage of total viewing audience that an event receives to provide a metric of Audience Response per percentage point of total audience size (for a specific time period). Also, ARMs can be divided by the potential size of a viewing audience (as estimated, for example, by the total number of homes with televisions in the US) to provide a metric of Audience Response as a share of all possible viewers of an event.

ARMs and CBMs can be used by the audience response engine 122, in conjunction with monetary values associated with an event, to estimate value via a monetary value metric. For example, a monetary value (cost) may be associated with advertisements placed during a particular broadcast television show. Thus, an ARM for that show can be divided by the cost of advertising during that show, in order to generate a normalized measure of the engagement per dollar value for the show. Similarly, the ARM for the advertisement itself can be measured against the cost; thus, generating another measure of engagement per dollar value for that advertisement. In addition to costs associated with advertising within a show, ARMs can be normalized by the costs associated with an event itself. For example, the ARM for a television show can be normalized by the cost of producing the show.

The above discussed ARMs can be combined with information about content items associated with time-based media events to create weighted ARMs. In one example, ARMs can be weighted by measures of the influence of each author of a content item. Such a weighted ARM provides a measure in which higher values are associated with response that comes from more influential authors.

V. Social Interface Configuration

Turning back to FIG. 1, users of the social networking system 106 access content provided by the social networking system 106 via the client devices 104. Typically, the front end 128 of the social networking system 106 provides interfaces to the client devices 104 that allow users to view and interact with different types of content. In one embodiment, the front end 128 provides a social feed interface to the user for consuming content. A social feed interface includes social media content items authored by the user, other users connected to the user, or by users connected to a user of interest to a requesting (or current) user. The social feed may also include additional curated content determined by the social networking system 106 as being of interest to the user. In an alternate embodiment, the front end 128 provides one or more event interfaces to the user for consuming content related to a particular time-based media event. An event interface includes information about a particular event and also includes social media content items determined to be relevant to the event.

Social Feed Configuration

The interface configuration engine 126 configures the interfaces that are provided by the front end 128 to the client devices 104. The interface configuration engine 126 includes a social feed module 130 that receives requests from the front end 128 to configure and provide a social feed associated with a user accessing the social networking system 106 (referred to herein as the "current user"). In response to the request, the social feed module 130 identifies different content items to be presented to the current user. The social feed module 130 combines the identified content items to generate a social feed that is transmitted to the front end 128 for display to the user. A user may browse the content items in the social feed by scrolling upward or downward and click on an individual content item in the social feed to access additional information about the content item.

The social feed module 130 identifies different types of content items for inclusion in a given social feed. These include social media content items, content retrieved from external sources, and items related to time-based media events that have aired or are about to air. For items related to time-based media events, the social feed module 130 identifies upcoming time-based media events stored in the media events 116 that may be of interest to the current user. The social feed module 130 inserts media bulletins associated with the identified upcoming time-based media events into the social feed. The media bulletins, when displayed to the user, indicate to the user that the media event is about to air and may be of interest to the user. The discussion below describes how upcoming time-based media events are selected for inclusion in a social feed (as media bulletins) and provides examples of media bulletins displayed to the user.

Figure 4:
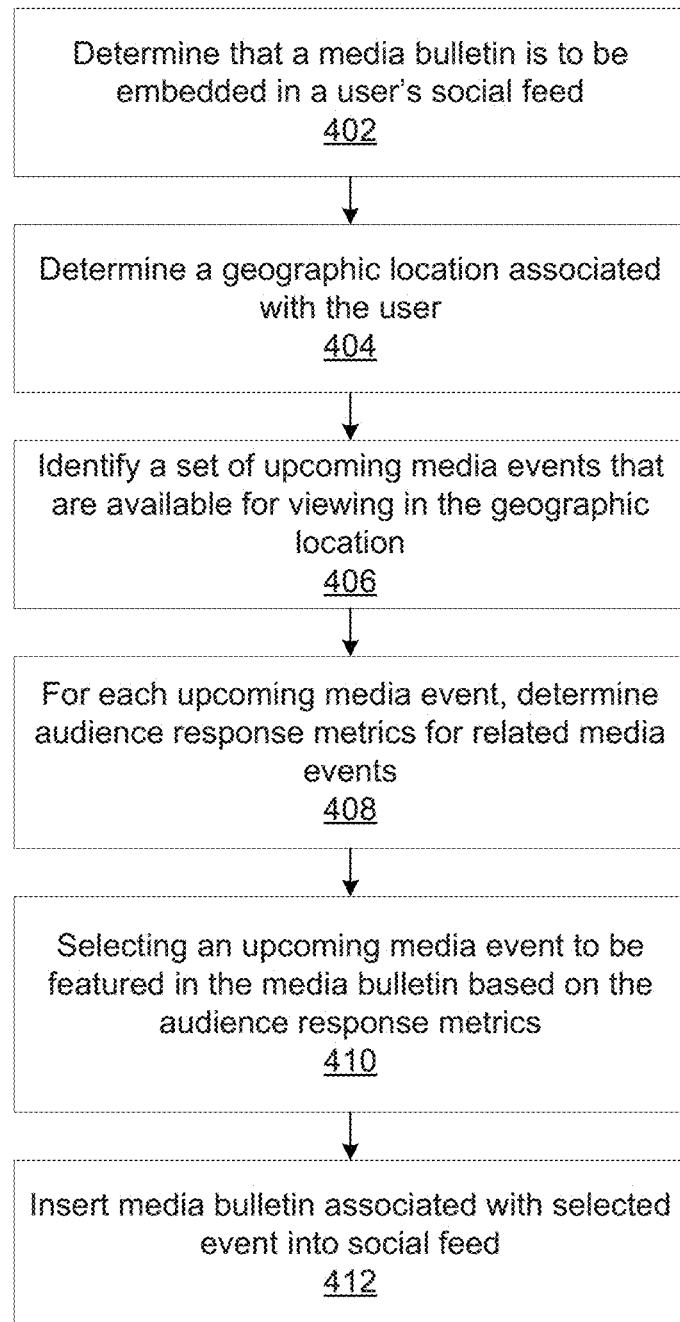
FIG. 4 is a flowchart illustrating steps for identifying upcoming media events that are to be included in a social feed according to one embodiment.

FIG. 4 is a flowchart illustrating steps for identifying upcoming media events that are to be included in a social feed according to one embodiment. At step 402, the social feed module 130 determines that a media bulletin is to be embedded in a user's social feed. The determination may be based on a number of factors. One factor may be the number of content items already identified for inclusion in the social feed. For example, when the number of content items is below a threshold, the social feed module 130 may determine that one or more media bulletins should be added to the social feed to fill up the user's social feed. Another factor may be the user's previous response to viewing media bulletins. For example, if the user has interacted with a previously-presented media bulletin, then the social feed module 130 may determine that one or more media bulletins should be added to the social feed.

At step 404, the social feed module 130 determines a geographic location associated with the user. In one embodiment, the geographic location may be based on location data transmitted by the front end 128 to the social feed module 130 as part of the request for the social feed. In such an embodiment, the front end 128 receives the location from the client device 104 associated with the current user. In an alternate embodiment, the user information store 118 stores location information associated with the user, such as the user's residence city. In such an embodiment, the social feed module 130 determines the geographic location based on the location information stored in the user information store 118.

At step 406, the social feed module 130 identifies a set of upcoming media events that are available for viewing in the geographic location associated with the user. Specifically, the social feed module 130 parses the schedules in the programming guides provided by the time-based media sources 102 to identify the media events that are upcoming. For the purposes of this disclosure, an upcoming media event may be a media event that is going to be aired on a source 102 a certain amount of time in the future from the current time or has recently begun airing. For example, a media event starting in fifteen minutes or a media event that started 5 minutes ago may both be considered as upcoming media events.

At step 408, the social feed module 130 determines, for each of the identified upcoming media events, audience response metrics stored in the response metrics store 124 that are associated with media events related to the upcoming media event. A media event related to the upcoming media event may be a previous episode of the same show as the upcoming media event. Alternatively, a media event related to the upcoming media event may be a media event having similar metadata attributes as the upcoming media event. For example, if the upcoming media event is a sitcom, then any media event that is also a sitcom may be designated as related to the upcoming media event. As discussed above, metadata attributes of media events are determined by the event detection engine 110 and stored in the media events store 116.

At step 410, the social feed module 130 selects an upcoming media event to be featured in a media bulletin based on the audience response metrics associated with the event. In operation, the social feed module 130 selects the event because at least one of the ARMs computed for the event by the audience response engine 122 indicate that the event will likely be of interest to the current user. For example, if the content item-based ARMs for the event indicate that the number of individual content items associated with the event are above a threshold, then the social feed module 130 selects the event for featuring in a media bulletin.

At step 412, the social feed module 130 inserts a media bulletin associated with the selected event into the social feed of the current user. The media bulletin provides information about the selected event, such as the name, airing time and images/videos associated with the selected event. The social feed module 130 retrieves the information about the selected event from the media events store 116.

Figure 5:
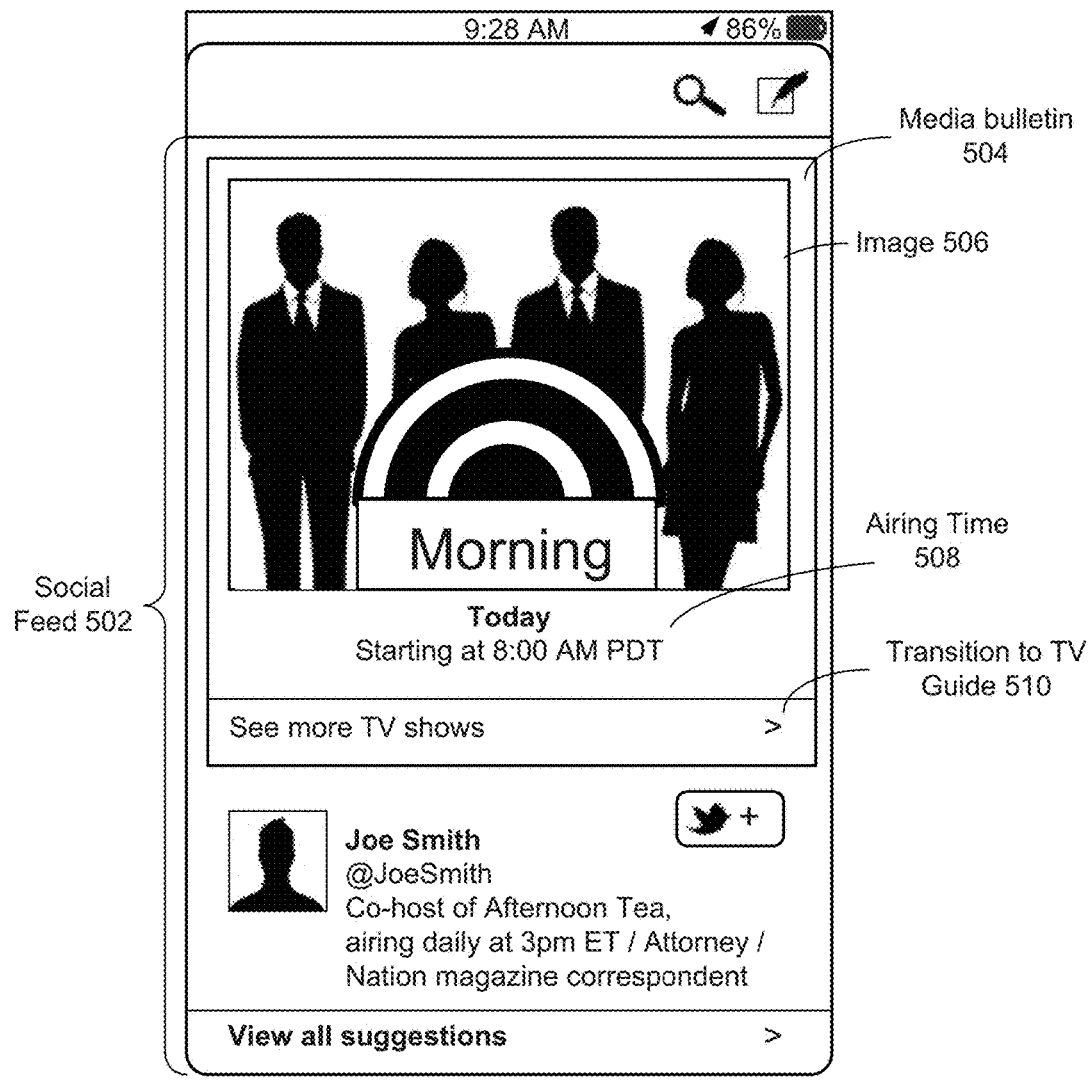
FIG. 5 is an exemplary illustration of a media bulletin inserted into a social feed according to one embodiment.

FIG. 5 is an exemplary illustration of a media bulletin inserted into a social feed 502 according to one embodiment. As shown, the social feed 502 includes the media bulletin 504 associated with the upcoming event selected by the social feed module 130. The media bulletin 504 includes an image 506 associated with the upcoming event and the airing time 508 of the upcoming event. The social feed 502 also includes a transition to the television guide 510. The user may click on the transition to the television guide 510 and be presented with a media guide interface shown in FIG. 6 and described below.

Media Event Interfaces

The interface configuration engine 126 also includes an event interface module 132 that receives requests from the front end 128 to configure and provide event interfaces for presentation to the current user.

Figure 6:
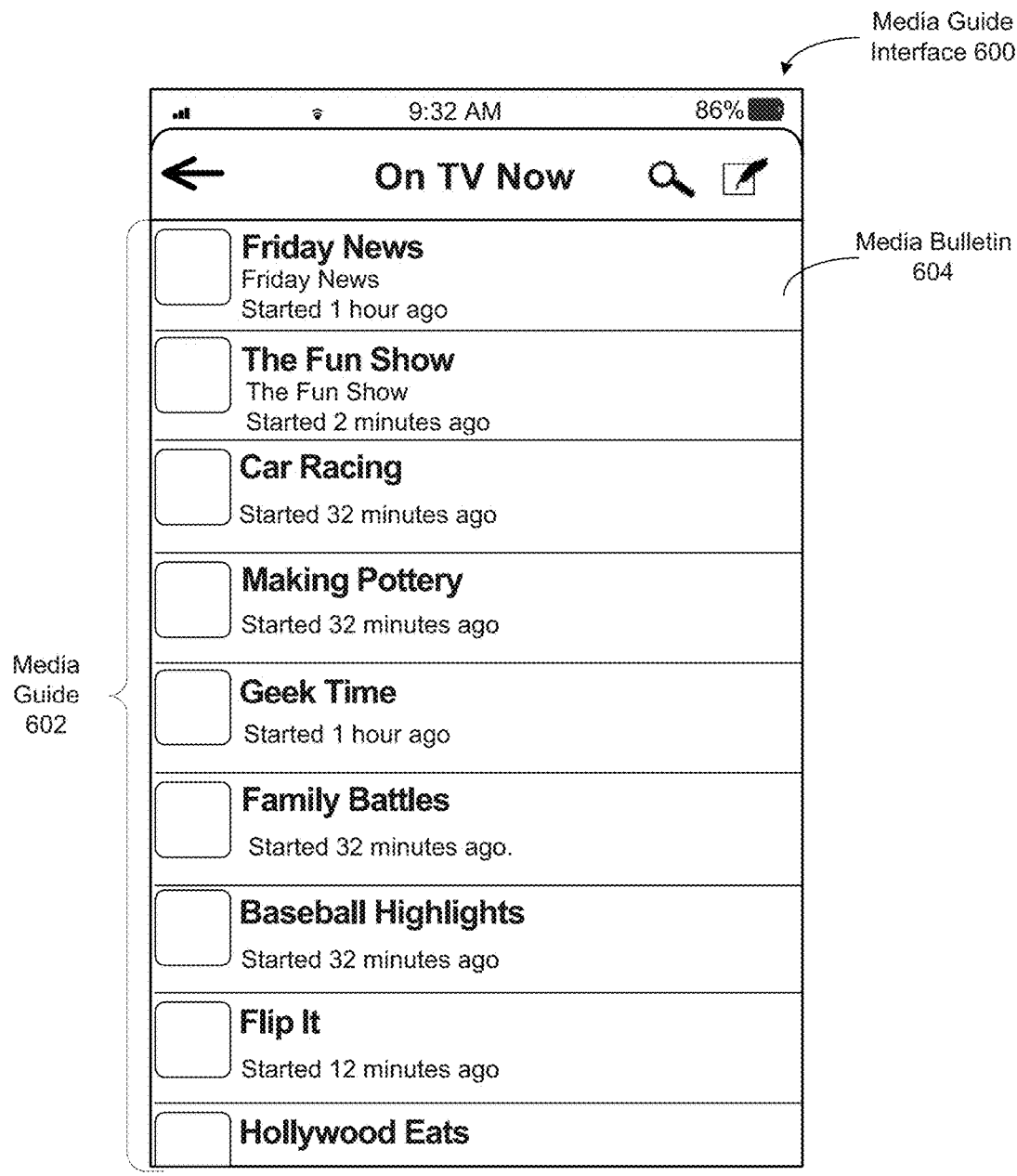
FIG. 6 is an exemplary illustration of a media guide interface according to one embodiment.

The event interface module 132 generates a media guide interface that includes information about multiple upcoming media events that may be of interest to the current user. FIG. 6 is an exemplary illustration of a media guide interface 600 according to one embodiment. As shown, the media guide interface 600 presents a media guide 602 that identifies multiple upcoming or current media events. Specifically, the media guide 602 includes a list of media bulletins, such as media bulletin 604. Each media bulletin provides information associated with an upcoming or currently airing media event.

The current user may interact with (e.g., click on) any of the media bulletins to access an event interface generated by the event interface module 132. The event interface associated with a given media event includes social media content items that are determined to be correlated with the event, external content that is determined to be relevant to the event and recommendations for the current user. The event interface also includes several interface elements that allow the current user to interact with the interface.

Figure 7:
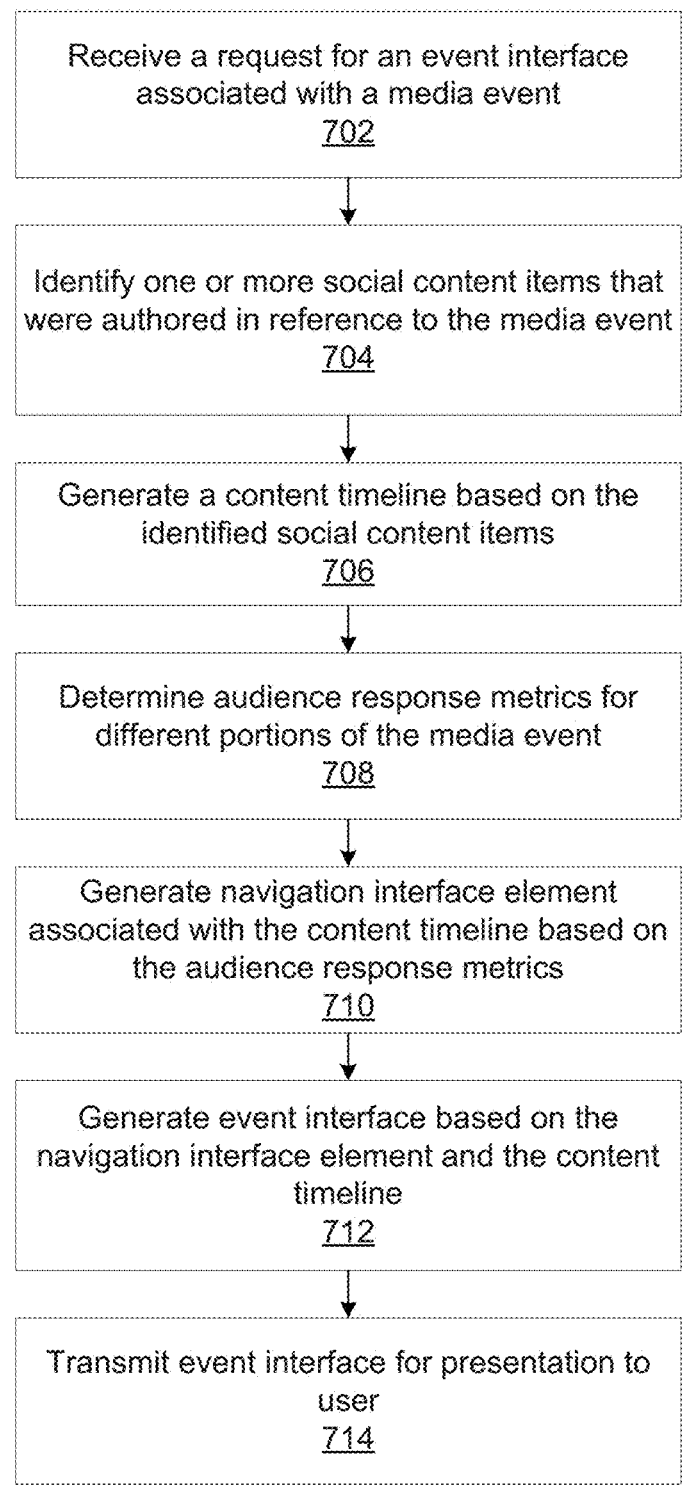
FIG. 7 is a flowchart illustrating steps for generating an event interface according to one embodiment.

FIG. 7 is a flowchart illustrating steps for generating an event interface according to one embodiment. At step 702, the event interface module 132 receives a request from the front end 128 for an event interface associated with a particular media event. In one embodiment, the front end 128 generates the request in response to a user interacting with a media bulletin associated with the event, for example, a media bulletin in a media guide interface. In another embodiment, the front end 128 generates the request in response to a user entering a search keyword that is associated with the media event.

At step 704, the event interface module 132 identifies, based on mappings stored in the correlation mapping store 118, one or more social content items that were authored in reference to the media event. In operation, the event interface module 132 identifies mappings that are associated with the media event. As discussed above, the mapping between a social content item and a media event represent the confidence that the content item references the media event. Based on the identified mappings, the event interface module 132 identifies social content items for which the confidence that the content item references the media event is above a threshold. The event interface module 132 retrieves the identified social content items from the content items store 114.

At step 706, the event interface module 132 generates a chronologically stored content timeline based on the identified social content items. In one embodiment, the event interface module 132 may select only a subset of the identified social content items for inclusion in the content timeline based on one or more selection factors. For example, the event interface module 132 may select content items that have specific types of content, such as audio/video content. In another example, the event interface module 132 may select more content items authored by users to whom the current user is connected relative to content items authored by users to whom the current user has no connection. In another example, the event interface module 132 may select content items that are authored by users who have affiliations with the media event, such as content items authored by the cast, producers, or director of the media event.

At step 708, the event interface module 132 determines, for different portions of the media event, audience response metrics stored in the response metrics store 124. At step 710, the event interface module 132 generates a navigation interface element associated with the content timeline. The navigation interface element is a user interface element that allows a user to navigate through the content items included in the content timeline. The navigation interface element represents the total time that a media event has aired. Each individual position on the navigation interface element is associated with a particular moment in time of the airing. Each position on the navigation interface element provides a visual representation of the audience response to the portion of the media event that was airing at that moment in time.

In one embodiment, each position corresponds to a different portion of the content timeline. Specifically, a given position corresponds to the portion of the content timeline that includes social content items that were authored in reference to the portion of the media event that was airing at or near that moment in time (e.g., within 30 seconds or a minute). Thus, a user, to whom the navigation interface element is presented, may navigate to different portions of the content timeline by navigating to or selecting different positions on the interface element.

At step 712, the event interface module 132 generates an event interface based at least on the navigation interface element and the content timeline. The event interface may be a combination of the navigation interface element and the content timeline on a single viewing pane of the event interface. Alternatively, the navigation interface element and the content timeline may be divided among two different viewing panes of the event interface, such that only one of the viewing panes is visible at any one time. Other configurations of the event interface are also possible.

The event interface module 132 may optionally combine additional interface elements with the navigation interface element and the content timeline when generating the event interface. For example, the event interface module 132 may access metadata associated with the media event from the media events store 116 and include the metadata in the event interface. Metadata may include images associated with the media event, airing times, names of actors and actresses, etc.

In another example, the event interface module 132 extracts audio, video or image content from the identified social content items to generate one or more vignettes for inclusion in the event interface. In yet another example, the event interface module 132 may include a "mute" interface element that allows the receiving user to prevent the content timeline from being updated by the SNS 106 with new content items while "muted." The event interface module 132 may also provide a content compose interface that allows the user to whom the interface is presented to author new content items associated with the media event. In one embodiment, the content compose interface includes pre-populated information related to the media event that allows the user to easily create new content related to the media event.

In addition, the event interface module 132 may identify users of the social networking system 106 who are affiliated with the media event. Once identified, the event interface module 132 includes in the event interface recommendations for adding such users to the current user's connection graph. The event interface module 132 may also include content retrieved from external sources that is relevant to the media event in the event interface. Examples of such content includes reviews of the media event retrieved from an external reviews source and information about actors and actresses featured in the media event from an internet-based movie database.

At step 714, the event interface module 132 transmits the event interface to the front end 128 for presentation to the user. In some embodiment, the front end 128 presents one portion of the content timeline to the user at any one time. In such embodiment, when the event interface is first presented to the user, the front end 128 presents the portion of the content timeline that includes social content items that were authored in reference to the most-recently aired portion of the media event.

Examples of event interfaces are described below in conjunction with FIGS. 8A-10.

Figure 8A:
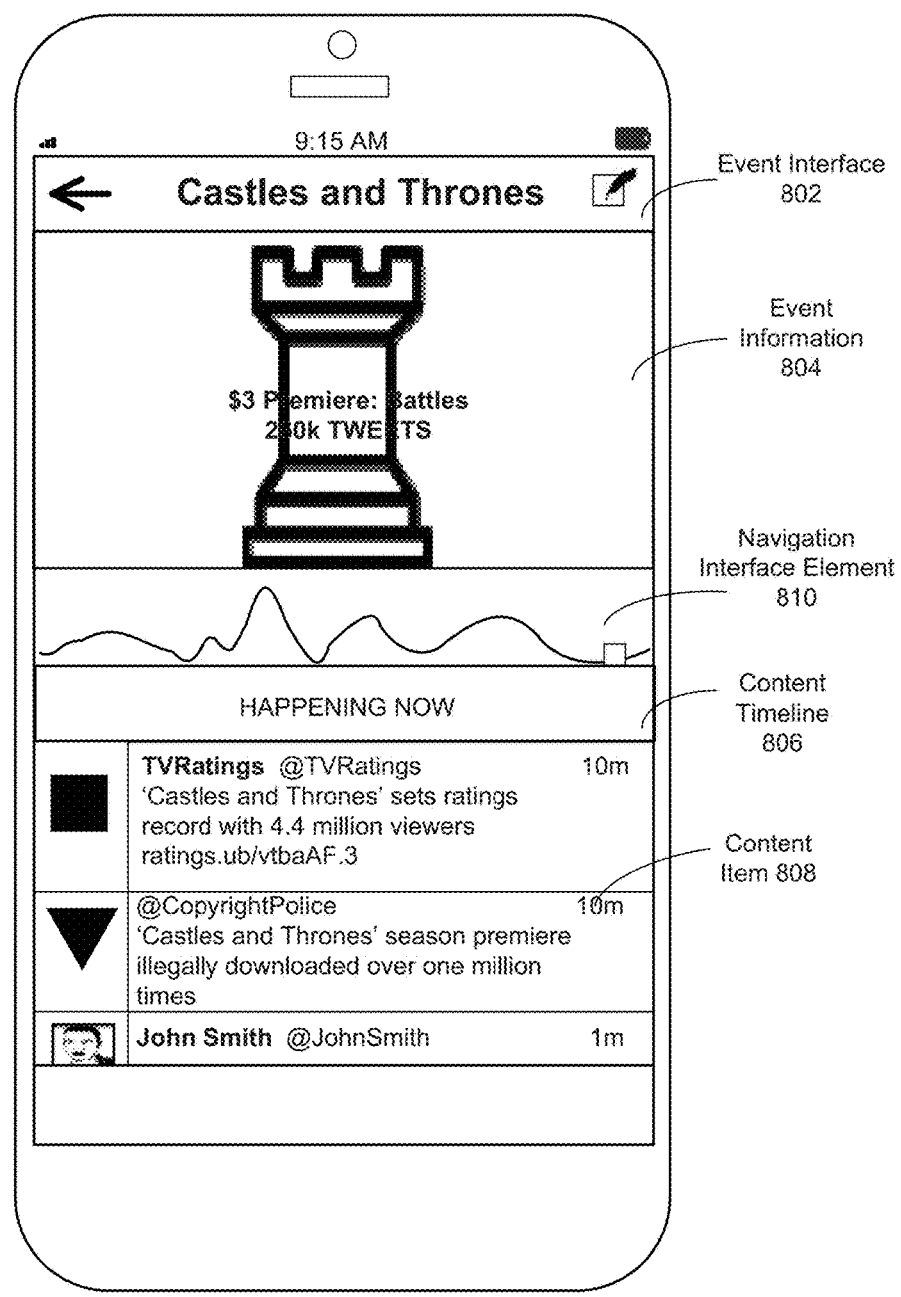
FIG. 8A is an exemplary illustration of an event interface associated with a media event according to one embodiment.

FIG. 8A is an exemplary illustration of an event interface 802 associated with a media event according to one embodiment. In the example shown is FIG. 8, the media event associated with the event interface 802 is a currently airing episode of the television show "CASTLES AND THRONES." As shown, the event interface 802 generated by the event interface module 132 includes event information element 804, a content timeline element 806 and a navigation interface element 810.

The event information element 804 includes information associated with the media event, e.g., the episode of "CASTLES AND THRONES." The content timeline element 806 includes a list of chronologically ordered content items, such as content item 808, that were authored in reference to the currently airing episode of "CASTLES AND THRONES," as determined by the correlation engine 112. As shown, each content item identifies the author of the content item, the time at which the content item was authored and the content itself. The content timeline element 806 is scrollable such that the user to whom the event interface 802 is able to navigate through the content timeline by swiping or moving scroll bars (not shown) upward/downward.

Figure 8B:
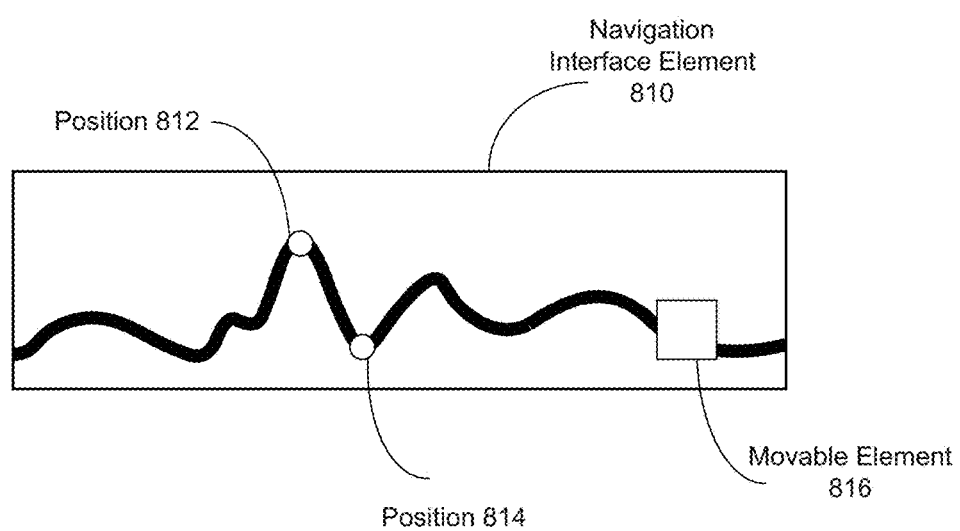
FIG. 8B illustrates a more detailed view of the navigation interface element according to one embodiment.

The navigation interface element 808, as discussed above, is a user interface element that provides an additional mechanism for the user to navigate through the content timeline element 806 and visually illustrates audience response to the media event. FIG. 8B illustrates a more detailed view of the navigation interface element 808 according to one embodiment. As shown, the navigation interface element 808 includes selectable positions 812 and 814 and a movable element 816. The selectable positions 812 and 814 each corresponds to a different point in time of the airing of the "CASTLES AND THRONES" episode.

In the illustrated embodiment, the height of each of the selectable positions 812 is a visual representation of the audience response metrics associated with the portion of the episode airing that corresponds to the selectable position. Positions corresponding to portions of the episode that are associated with audience response metrics indicating a high positive response are have greater heights than positions corresponding to portions of the episode that are associated with audience response metrics indicating a relatively less positive response. For example, the portion of the episode corresponding to the selectable position 812 received a higher positive response relative to the portion of the episode corresponding to the selectable position 814, as illustrated by the difference in heights of the selectable positions 812 and 814.

The movable element 816 enables the user to whom the event interface 802 is presented to navigate to the different selectable positions of the navigation interface element 810. As discussed above, each selectable position corresponds to a different portion of the episode and is associated with the portion of the content timeline element 806 that includes social content items that reference the portion of the episode. Therefore, when a user moves the movable element to a particular selectable position, the content timeline element 806 automatically scrolls upward or downward to display the content items that reference the portion.

Figure 9:
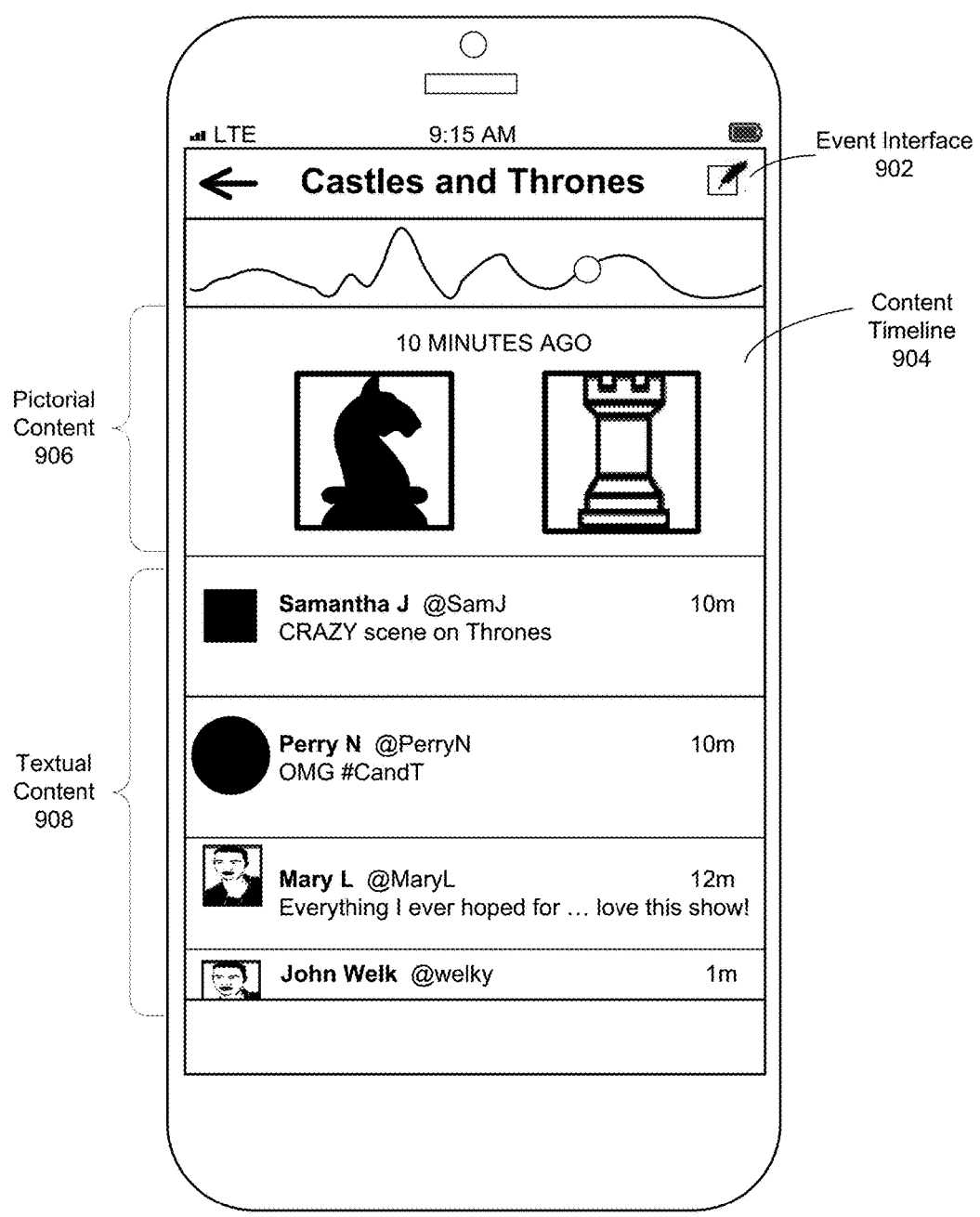
FIG. 9 is an exemplary illustration of an event interface associated with a media event according to an alternate embodiment.

FIG. 9 is an exemplary illustration of an event interface 902 associated with a media event according to an alternate embodiment. In this embodiment, the content timeline element 904 is divided into two portions: pictorial content 906 and textual content 908. The pictorial content 906 includes image or video content extracted from social content items while the textual content 908 includes text-based social content items.

Figure 10:
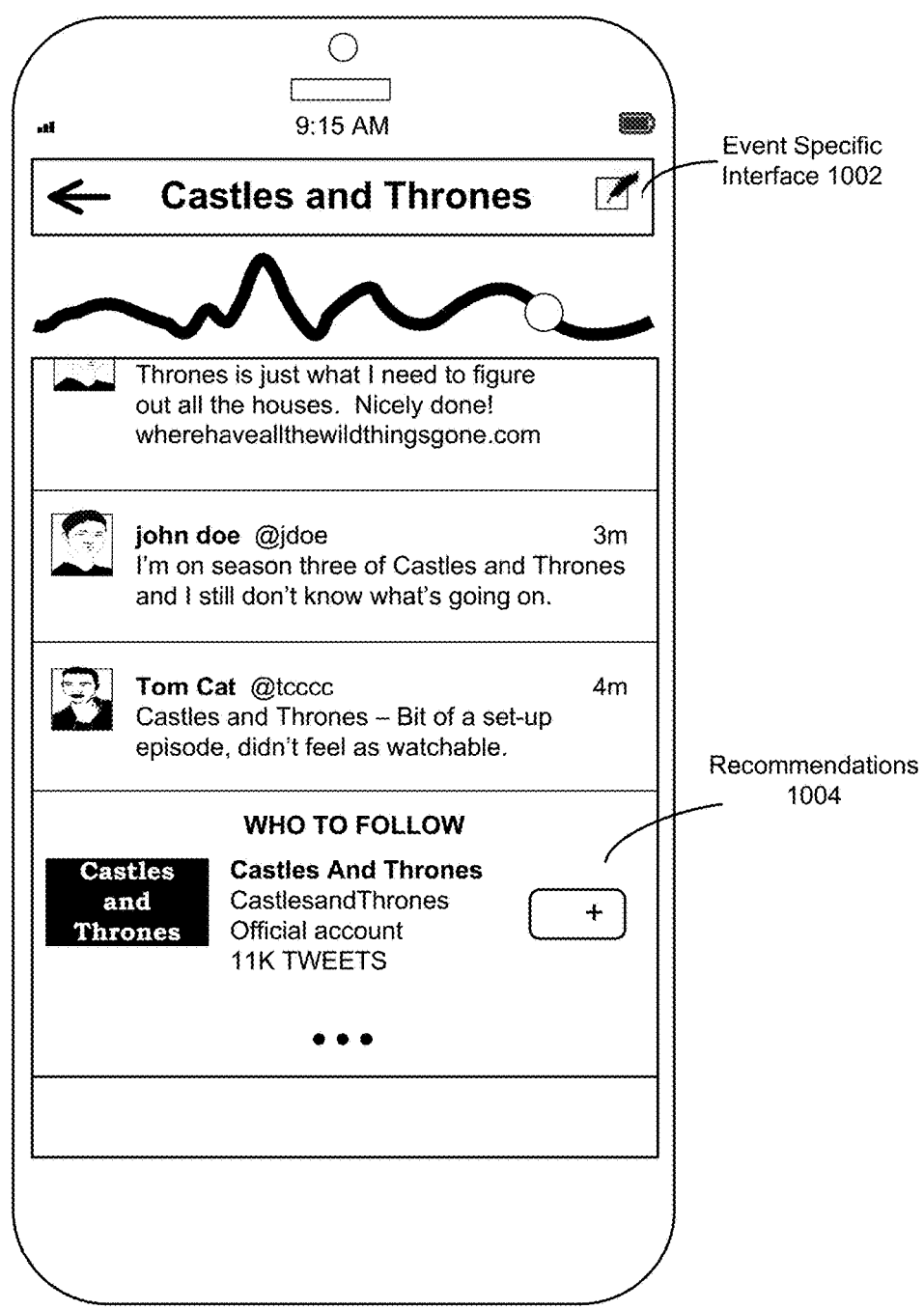
FIG. 10 is an exemplary illustration of an event interface associated with a media event according to another alternate embodiment.

FIG. 10 is an exemplary illustration of an event interface 1002 associated with a media event according to another alternate embodiment. In this embodiment, the event interface 1002 includes a recommendations interface 1004 that includes one or more recommendations for the viewing user. The recommendations interface 1004 includes recommendations for adding other users who are determined to be affiliated with the media event. The recommendations interface 1004 may also include links to event interfaces associated with related media events. For example, the recommendations interface 1004 may include links to event interfaces associated with other episodes of "CASTLES AND THRONES."

VII. Additional Considerations

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

As noted above, the social networking system 106 comprises a number of "engines," which refers to computational logic for providing the specified functionality. An engine can be implemented in hardware, firmware, and/or software. An engine may sometimes be equivalently referred to as a "module," "system", or a "server." It will be understood that the named components represent one embodiment of the present invention, and other embodiments may include other components. In addition, other embodiments may lack the components described herein and/or distribute the described functionality among the components in a different manner. Additionally, the functionalities attributed to more than one component can be incorporated into a single component. Where the engines described herein are implemented as software, the engine can be implemented as a standalone program, but can also be implemented through other means, for example as part of a larger program, as a plurality of separate programs, or as one or more statically or dynamically linked libraries. In any of these software implementations, the engines are stored on the computer readable persistent storage devices of the social networking system 106, loaded into memory, and executed by one or more processors (generally, "a processor") of the system's computers. The operations of the social networking system 106 and its various components will be further described below with respect to the remaining figures. As will become apparent, the various data processing operations described herein are sufficiently complex and time consuming as to require the operation of a computer system such as the social networking system 106, and cannot be performed merely by mental steps.

Embodiments described may also relate to an apparatus for performing the operations herein. This apparatus may be specially constructed for the required purposes, and/or it may comprise a general-purpose computing device selectively activated or reconfigured by a computer program stored in the computer. Such a computer program may be persistently stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability. Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments described is intended to be illustrative, but not limiting, of the scope of what is protectable, which is set forth in the following claims.

What is claimed is:

1. A method for presenting social media content items associated with time-based media events, the method comprising:
    generating a graph interface element including a set of positions along a time axis, where each position is associated with a different portion of a broadcasted media event, the graph interface element depicting a measure of a plurality of content items that have been authored by one or more users of a social networking system and that have been determined to be correlated with the portions of the broadcasted media event associated with the set of positions;
    generating a movable interface element that enables selection among the set of positions included in the graph interface element;
    populating a content timeline interface element with the content items arranged in chronological order, each portion of the content timeline interface element including content items correlated with a different portion of the broadcasted media event;
    providing a concurrent display of the content interface element, the graph interface element, and the movable interface element;
    determining selection of a first of the set of positions based on the movable interface element having been visually moved to select the first position; and
    in response to the selection of the first position, causing the provided content timeline interface element to vertically scroll to a first portion of the content timeline interface element that includes content items correlated with a first portion of the broadcasted media event associated with the selected first position;
    extracting non-textual content from a plurality of the content items correlated with the first portion of the broadcasted media event;
    combining the extracted non-textual content to generate a vignette representing the first portion of the broadcasted media event; and
    including the vignette in a visually distinct portion of the concurrent display.

2. The method of claim 1, wherein the time axis represents a total time that the broadcasted media event was broadcasted.

3. The method of claim 1, wherein the graph interface element comprises a continuous graph.

4. The method of claim 1, further comprising computing a set of audience response metrics based at least on the plurality of content items, the audience response metrics measuring a response of the users of the social networking system to a plurality of portions of the broadcasted media event.

5. The method of claim 4, wherein a height of the graph interface element at the first position corresponds to the audience response metrics computed for the portion of the broadcasted media event associated with the first position.

6. The method of claim 1, wherein displaying the content timeline interface element comprises displaying a first portion of the content timeline interface element that includes content items correlated with a portion of the broadcasted media event that was aired most recently.

7. The method of claim 1, further comprising:
    identifying a set of users of the social networking system that are affiliated with the broadcasted media event; and
    recommending to a user that the user form connections with the identified set of users.

8. The method of claim 1, further comprising displaying to a user a content compose interface that enables the user to compose content items related to the broadcasted media event, the content compose interface being pre-populated with information related to the broadcasted media event.

9. The method of claim 1, further comprising generating a mute interface element that, when selected, prevents the displayed content timeline interface element from being updated with new content items correlated with the broadcasted media event.

10. The method of claim 1, further comprising:
analyzing a set of candidate content items to determine the content items that are correlated with the broadcast media event, the analyzing comprising:
performing a comparative feature extraction on the candidate content items to generate feature vector representations for the candidate content items;
inputting the feature vector representations and information associated with the broadcasted media event into a correlation function to determine a set of confidences that the candidate content items are correlated with the broadcasted media event; and
identifying the content items where the confidence exceeds a threshold.

11. A non-transitory computer readable storage medium storing program code for presenting social media content items associated with time-based media events, the program when executed by at least one processor causing the processor to:
generate a graph interface element including a set of positions along a time axis, where each position is associated with a different portion of a broadcasted media event, the graph interface element depicting a measure of a plurality of content items that are authored by one or more users of a social networking system and that have been determined to be correlated with the portions of the broadcasted media event associated with the set of positions;
generate a movable interface element that enables selection among the set of positions included in the graph interface element;
populate a content timeline interface element with the plurality of content items arranged in chronological order, each portion of the content timeline interface element including content items correlated with a different portion of the broadcasted media event;
provide a concurrent display of the content timeline interface element, the graph interface element, and the movable interface element;
determine selection of a first of the set of positions based on the movable interface element having been visually moved to select the first position; and
in response to the selection of the first position,
cause the provided content timeline interface element to vertically scroll to a first portion of the content timeline interface element that includes content items correlated with a first portion of the broadcasted media event associated with the selected first position;
extract non-textual content from a plurality of the content items correlated with the first portion of the broadcasted media event;
combine the extracted non-textual content to generate a vignette representing the first portion of the broadcasted media event; and
include the vignette in a visually distinct portion of the concurrent display.

12. The computer readable storage medium of claim 11, wherein the time axis represents a total time that the broadcasted media event was broadcasted.

13. The computer readable storage medium of claim 11, wherein the graph interface element comprises a continuous graph.

14. The computer readable storage medium of claim 11, wherein the program when executed by the computer processor further causes the processor to compute a set of audience response metrics based at least on the plurality of content items, the audience response metrics measuring a response of the users of the social networking system to a plurality of portions of the broadcasted media event.

15. The computer readable storage medium of claim 14, wherein a height of the graph interface element at the first position corresponds to the audience response metrics computed for the portion of the broadcasted media event associated with the first position.

16. The computer readable storage medium of claim 11, wherein displaying the content timeline interface element comprises displaying a first portion of the content timeline interface element that includes content items correlated with a portion of the broadcasted media event that was aired most recently.

17. The computer readable storage medium of claim 11, wherein the program when executed by the computer processor further causes the processor to:
identify a set of users of the social networking system that are affiliated with the broadcasted media event; and
recommend to a user that the user form connections with the identified set of users.

18. The computer readable storage medium of claim 11, wherein the program when executed by the computer processor further causes the processor to display to a user a content compose interface that enables the user to compose content items related to the broadcasted media event, the content compose interface being pre-populated with information related to the broadcasted media event.

19. The computer readable storage medium of claim 11, wherein the program when executed by the computer processor further causes the processor to generate a mute interface element that, when selected, prevents the displayed content timeline interface element from being updated with new content items correlated with the broadcasted media event.

20. The computer readable storage medium of claim 11, wherein the program when executed by the computer processor further causes the processor to
analyze a set of candidate content items to determine the content items that are correlated with the broadcast media event, the analysis comprises:
performing a comparative feature extraction on the candidate content items to generate feature vector representations for the candidate content items;
inputting the feature vector representations and information associated with the broadcasted media event into a correlation function to determine a set of confidences that the candidate content items are correlated with the broadcasted media event; and
identifying the content items where the confidence exceeds a threshold.

21. A system for presenting social media content items associated with time-based media events, the system comprising:
a computer processor; and
a memory storing program code for presenting social media content items associated with time-based media events, the program when executed by the computer processor causing the processor to:
generate a graph interface element including a set of positions along a time axis, where each position is associated with a different portion of a broadcasted media event, the graph interface element depicting a measure of a plurality of content items that are authored by one or more users of a social networking system and that have been determined to be correlated with the portions of the broadcasted media event associated with the set of positions;
generate a movable interface element that enables selection among the set of positions included in the graph interface element,
populate a content timeline interface element with the plurality of content items arranged in chronological order, each portion of the content timeline interface element including content items correlated with a different portion of the broadcasted media event,
provide a concurrent display of the content timeline interface element, the graph interface element, and the movable interface element,
determine selection of a first of the set of positions based on the movable interface element having been visually moved to select the first position, and
in response to the selection of the first position;
 cause the provided content timeline interface element to vertically scroll to a first portion of the content timeline interface element that includes content items correlated with a first portion of the broadcasted media event associated with the selected first position;
 extract non-textual content from a plurality of the content items correlated with the first portion of the broadcasted media event;
 combine the extracted non-textual content to generate a vignette representing the first portion of the broadcasted media event; and
 include the vignette in a visually distinct portion of the concurrent display.

22. The system of claim 21, wherein the time axis represents a total time that the broadcasted media event was broadcasted.

23. The system of claim 21, wherein the graph interface element comprises a continuous graph.

24. The system of claim 21, wherein the program when executed by the computer processor further causes the processor to compute a set of audience response metrics based at least on the plurality of content items, the audience response metrics measuring a response of the users of the social networking system to a plurality of portions of the broadcasted media event.

25. The system of claim 24, wherein a height of the graph interface element at the first position corresponds to the audience response metrics computed for the portion of the broadcasted media event associated with the first position.

26. The system of claim 21, wherein displaying the content timeline interface element comprises displaying a first portion of the content timeline interface element that includes content items correlated with a portion of the broadcasted media event that was aired most recently.

27. The system of claim 21, wherein the program when executed by the computer processor further causes the processor to:
 identify a set of users of the social networking system that are affiliated with the broadcasted media event; and
 recommend to a user that the user form connections with the identified set of users.

28. The system of claim 21, wherein the program when executed by the computer processor further causes the processor to display to a user a content compose interface that enables the user to compose content items related to the broadcasted media event, the content compose interface being pre-populated with information related to the broadcasted media event.

29. The of claim 21, wherein the program when executed by the computer processor further causes the processor to generate a mute interface element that, when selected, prevents the displayed content timeline interface element from being updated with new content items correlated with the broadcasted media event.

30. The system of claim 21, wherein the program when executed by the computer processor further causes the processor to
 analyze a set of candidate content items to determine the content items that are correlated with the broadcast media event, the analysis comprises:
 performing a comparative feature extraction on the candidate content items to generate feature vector representations for the candidate content items;
 inputting the feature vector representations and information associated with the broadcasted media event into a correlation function to determine a set of confidences that the candidate content items are correlated with the broadcasted media event; and
 identifying the content items where the confidence exceeds a threshold.

* * * * *

UNITED STATES PATENT AND TRADEMARK OFFICE
CERTIFICATE OF CORRECTION

PATENT NO.         : 9,553,922 B1
APPLICATION NO.    : 14/267077
DATED              : January 24, 2017
INVENTOR(S)        : Lillian Milagros Carrasquillo et al.

It is certified that error appears in the above-identified patent and that said Letters Patent is hereby corrected as shown below:

In the Claims

Claim 1, Column 22, Line 12, delete "content interface" and insert --content timeline interface--.
Claim 29, Column 26, Line 23, delete "The of claim" and insert --The system of claim--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*